United States Patent
Dhawan et al.

(10) Patent No.: US 9,426,269 B2
(45) Date of Patent: Aug. 23, 2016

(54) SYSTEM AND METHOD FOR PERFORMING CERTAIN ACTIONS BASED UPON A DIALED TELEPHONE NUMBER

(75) Inventors: Vishal Dhawan, Centreville, VA (US); Timothy M. Price, Rockville, MD (US); Manoj Sindhwani, Oak Hill, VA (US)

(73) Assignee: XTONE NETWORKS, INC., Reston, VA (US)

( * ) Notice: Subject to any disclaimer, the term of this patent is extended or adjusted under 35 U.S.C. 154(b) by 228 days.

(21) Appl. No.: 12/717,858

(22) Filed: Mar. 4, 2010

(65) Prior Publication Data

US 2010/0158230 A1  Jun. 24, 2010

Related U.S. Application Data

(63) Continuation-in-part of application No. 11/514,116, filed on Sep. 1, 2006, now abandoned.

(60) Provisional application No. 60/712,808, filed on Sep. 1, 2005, provisional application No. 61/157,306, filed on Mar. 4, 2009.

(51) Int. Cl.
| | |
|---|---|
| *H04M 1/253* | (2006.01) |
| *H04M 1/247* | (2006.01) |
| *H04M 1/2745* | (2006.01) |
| *H04M 3/493* | (2006.01) |

(52) U.S. Cl.
CPC ...... *H04M 1/2478* (2013.01); *H04M 1/274566* (2013.01); *H04M 3/4931* (2013.01); *H04M 1/2535* (2013.01); *H04M 2201/40* (2013.01); *H04M 2250/74* (2013.01)

(58) Field of Classification Search
USPC ............ 379/142.01, 207.16, 373.01, 373.02, 379/373.03, 114.13, 207.08; 455/412.2, 455/414.1, 418–420, 567
See application file for complete search history.

(56) References Cited

U.S. PATENT DOCUMENTS

| | | | |
|---|---|---|---|
| 5,073,923 A | 12/1991 | Offers et al. | |
| 5,323,444 A | 6/1994 | Ertz et al. | |
| 6,334,103 B1 | 12/2001 | Surace et al. | |
| 6,408,272 B1 | 6/2002 | White et al. | |
| 6,636,504 B1 * | 10/2003 | Albers ................ | H04M 7/1225 370/352 |
| 6,636,831 B1 | 10/2003 | Profit, Jr. et al. | |
| 6,738,743 B2 | 5/2004 | Sharma et al. | |
| 6,757,781 B2 | 6/2004 | Williams et al. | |
| 6,829,334 B1 | 12/2004 | Zirngibl et al. | |
| 6,882,974 B2 | 4/2005 | James et al. | |
| 6,901,431 B1 | 5/2005 | Dodrill et al. | |

(Continued)

FOREIGN PATENT DOCUMENTS

WO  96/20448  7/1996

OTHER PUBLICATIONS

U.S. Appl. No. 12/717,893, filed Mar. 4, 2010.

(Continued)

*Primary Examiner* — Amal Zenati
(74) *Attorney, Agent, or Firm* — Nixon & Vanderhye P.C.

(57) ABSTRACT

Systems and methods of placing a telephone call for a user include monitoring the telephone number that the user has requested to reach. Depending upon the telephone number requested by the user, the system might take an alternate action, rather than simply placing a call to the requested telephone number. In some instances, the system might take an action in addition to placing a call to the requested telephone number.

26 Claims, 5 Drawing Sheets

(56) References Cited

U.S. PATENT DOCUMENTS

| | | | |
|---|---|---|---|
| 6,977,992 B2 | 12/2005 | Zirngibl et al. | |
| 6,988,070 B2 | 1/2006 | Kawasaki et al. | |
| 7,016,847 B1 | 3/2006 | Tessel et al. | |
| 7,020,609 B2 | 3/2006 | Thrift et al. | |
| 7,062,709 B2 | 6/2006 | Cheung | |
| 7,801,283 B2* | 9/2010 | Harwood | H04M 1/6091 379/88.03 |
| 2002/0001370 A1 | 1/2002 | Walker et al. | |
| 2002/0059073 A1 | 5/2002 | Zondervan et al. | |
| 2002/0169604 A1 | 11/2002 | Damiba et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0114202 A1* | 6/2003 | Suh | H04M 1/271 455/569.2 |
| 2003/0144005 A1 | 7/2003 | Videtich | |
| 2003/0233238 A1 | 12/2003 | Creamer et al. | |
| 2004/0006471 A1 | 1/2004 | Chiu | |
| 2004/0010412 A1 | 1/2004 | Chiu | |
| 2004/0068364 A1 | 4/2004 | Zhao et al. | |
| 2004/0151285 A1 | 8/2004 | Sychta | |
| 2004/0163073 A1 | 8/2004 | Krzyzanowski et al. | |
| 2004/0174983 A1* | 9/2004 | Olschwang et al. | 379/377 |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0293897 A1 | 12/2006 | White et al. | |
| 2007/0143113 A1 | 6/2007 | Nanavati et al. | |

OTHER PUBLICATIONS

U.S. Appl. No. 12/717,881, filed Mar. 4, 2010.
U.S. Appl. No. 12/717,888, filed Mar. 4, 2010.
U.S. Appl. No. 12/717,875, filed Mar. 4, 2010.
U.S. Appl. No. 12/717,854, filed Mar. 4, 2010.
U.S. Appl. No. 12/717,839, filed Mar. 4, 2010.
U.S. Appl. No. 12/717,826, filed Mar. 4, 2010.
U.S. Appl. No. 12/717,897, filed Mar. 4, 2010.
U.S. Appl. No. 12/717,865, filed Mar. 4, 2010.
U.S. Appl. No. 11/514,116, filed Sep. 1, 2006.
Office Action issued on Feb. 26, 2010 in U.S. Appl. No. 11/514,116.

* cited by examiner

SYSTEM AND METHOD FOR PERFORMING CERTAIN ACTIONS BASED UPON A DIALED TELEPHONE NUMBER

This application claims priority to the filing date of U.S. Provisional Application No. 61/157,306, which was filed on Mar. 4, 2009, the contents of which are hereby incorporated by reference. This application is also a continuation-in-part of U.S. application Ser. No. 11/514,116, which was filed on Sep. 1, 2006, now abandoned which itself claims priority to the filing date of U.S. Provisional Application No. 60/712,808, which was filed on Sep. 1, 2005, the contents of both of which are hereby incorporated by reference.

FIELD OF THE INVENTION

The invention relates to systems and methods for monitoring a user as the user dials a telephone number, and for taking some action, based on the dialed number, in addition to or other than connecting the user to the dialed telephone number.

BACKGROUND OF THE INVENTION

There are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

The prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

Further, cost structures and provisioning algorithms that provision the capabilities of such a centralized voice services platform make it virtually impossible to ensure that a caller can always access the system when the system is under heavy usage. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

DETAILED DESCRIPTION OF PREFERRED EMBODIMENTS

Figure 1:
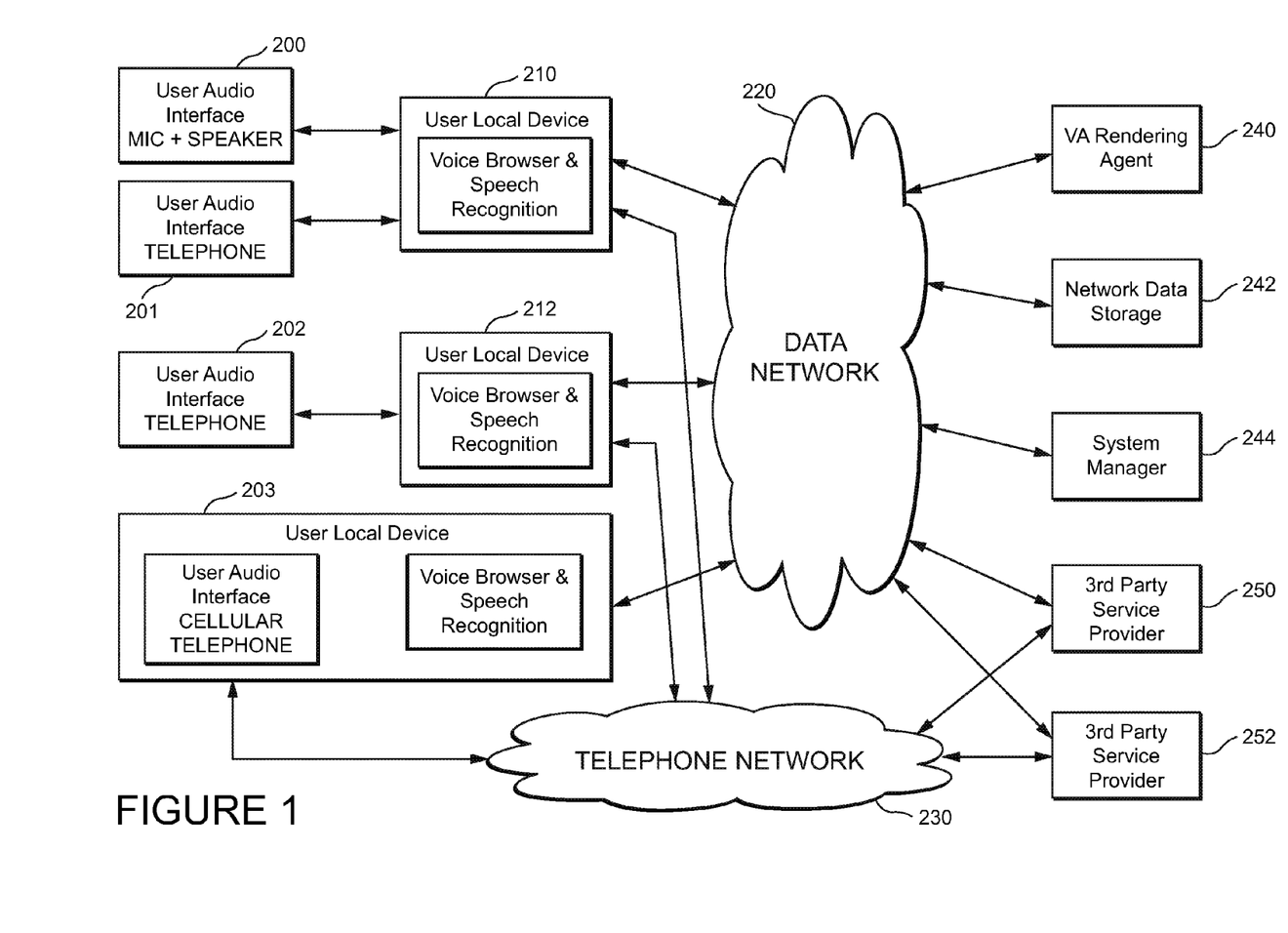
FIG. 1 is a diagram illustrating elements of a system embodying the invention.

The inventors have developed new systems and methods of delivering voice-based services to users which make use of some aspects of the basic architecture illustrated in FIG. 1. A full description of the systems and methods created by the inventors is provided in U.S. patent application Ser. No. 11/514,116, which was filed on Sep. 1, 2006.

The systems and methods created by the inventors are intended to provide users with speech and touch tone enabled Voice Applications for accessing various services and for performing various functions. In this respect, the systems, devices and methods embodying the invention serve some of the same functions as prior art centralized voice services platforms. The systems and methods can also be used to provide the same type of call forwarding discussed above, but at a lower cost, and with greater flexibility. In addition, the systems and methods created by the inventors make it possible to provide users with a whole host of additional call handling and call notification functions that would have been impossible with prior systems.

Unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art systems, but with better performance, at a significantly reduced cost, and with far fewer limitations. In addition, systems and methods embodying the invention avoid or solve many of the drawbacks of the prior systems. Further, because of the way systems and methods embodying the invention operate, they can provide new and additional services that could never have been provided by the prior art systems. Systems and methods embodying the invention also allow for much better personalization of delivered services, and they allow existing services to be upgraded, improved, or further personalized much more easily than was possible with the prior art systems.

Systems and methods embodying the invention are intended to deliver or provide Voice Applications (hereinafter, "VAs") for a user. Before beginning a discussion of systems and methods that embody the invention, we should start by discussing what a VA is, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also for the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 1, which depicts a high-level diagram of how a system embodying the invention would be organized.

As shown in FIG. 1, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Systems embodying the invention, as shown in FIG. 1, will be referred to as having a Distributed Voice Application Execution System Architecture (hereinafter, a "DVAESA"). Thus, the term DVAESA refers to a system and method of providing voice application services in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVEASA. In the embodiment shown in FIG. 1, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 1, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 1 is intended to illustrate this sort of an embodiment.

Also, in FIG. 1, various lines connect each of the individual elements. These lines are only intended to represent a functional connection between the two devices. These lines could represent hard-wired connections, wireless connections, infrared communications, or any other communications medium that allows the devices to interact. In some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 1 could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 1, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 1 is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VA, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. Such devices are often referred to as embedded multimedia terminal adaptors (EMTAs) and optical embedded multimedia terminal adaptors (OEMTAs). In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local embedded device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting.

The processing and interpretation of a user's spoken commands could be entirely accomplished on the local device 212. In other embodiments, the local device might need to consult a speech recognition engine on a remote device, via the data network, to properly interpret a portion of a spoken command that cannot be understood or interpreted by the local device. In still other embodiments, the user's spoken commands could be entirely processed and interpreted by a remote speech recognition engine. For instance, a recording of the user's spoken commands could be relayed to a remote speech recognition engine, and the speech recognition engine would then process the spoken commands and send data back the local device indicating what the user is commanding. Even this process could be accomplished in real time such that the user is unaware that the interpretation of his spoken commands is being accomplished on a remote device.

Because of the greater sophistication that is possible with a system embodying the invention, if the local device does not understand something, it can often ask another question of the user to clarify the situation. In addition, the local device can offer greatly expanded vocabulary and speech processing by enlisting the assistance of network agents. For all these reasons, a consumer electronic device that is coupled into the DVAES architecture can provide a much more sophisticated voice application than prior art devices which were not connected to a network.

Once the spoken command has been interpreted, in some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. A voice application performed on the local device would interpret the user's spoken request. This could be done on the local device, or the voice application could utilize remote assets to accomplish the speech recognition. Some or all of the speech recognition could occur on the remote assets. The voice application would then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced cost. And, as explained below, the services can be delivered with greater performance and with new and better features.

In some embodiments, rendered Voice Application processing is performed on the local device and the associated the voice recognition functions may also be performed on the local device. For this reason, there is no need to establish a dedicated duplex audio link with a remote high end computer. Also, even in those instances where a portion of the voice application processing is performed by a remote device, and/or where processing and interpretation of spoken commands is processed by a remote device, the communications necessary to accomplish these actions can be made via data packets that traverse a data network. Thus, here again, there is no need to establish a dedicated duplex audio link with a remote high end computer to provide the requested services.

Also, because the local embedded device is coupled to a data network such as the Internet, it can rapidly obtain Rendered Voice Applications and associated data from various remote sources in order to satisfy user requests. For these reasons, the simple embedded local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVEASA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches and IVR servers. The central voice services platforms also require more intensive management and provisioning than a DVAESA, and this management must be provided by highly skilled personnel as most of the equipment used is highly proprietary in nature. In contrast, the DVAESA is largely managed by an automated management system.

A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make a synchronous or asynchronous request over the Internet. Typically, the information will be quite rapidly returned and played to the user. Thus, even if there is a small delay, the user is nevertheless still connected the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform to service the same number of users. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, and are tied to physical phone lines, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so than in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet The architecture of a DVAESA makes it inherently able to deliver certain types of VAs with vastly improved performance. To use one concrete example, as noted above, when a central voice services application is attempting to deliver the same audio message to large number of users, the central voice services application must place a telephone call to each user, using a dedicated phone line, and deliver the message.

Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up it's phone lines, and thus it's capacity to allow users to call in for services. In contrast, when a DVAESA is delivering audio messages to a plurality of users, the users are still able to access their voice services for other purposes.

A DVAESA embodying the invention also makes it possible to deliver many new voice applications and services that could never have been provided by the prior art central voice services platform. In most cases, it is the underlying differences in the architecture of a DVAESA embodying the invention, as compared to the prior art voice services platforms, which make these new services possible.

For example, a user could configure a voice application to run constantly in the background on a local device, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

Figure 2:
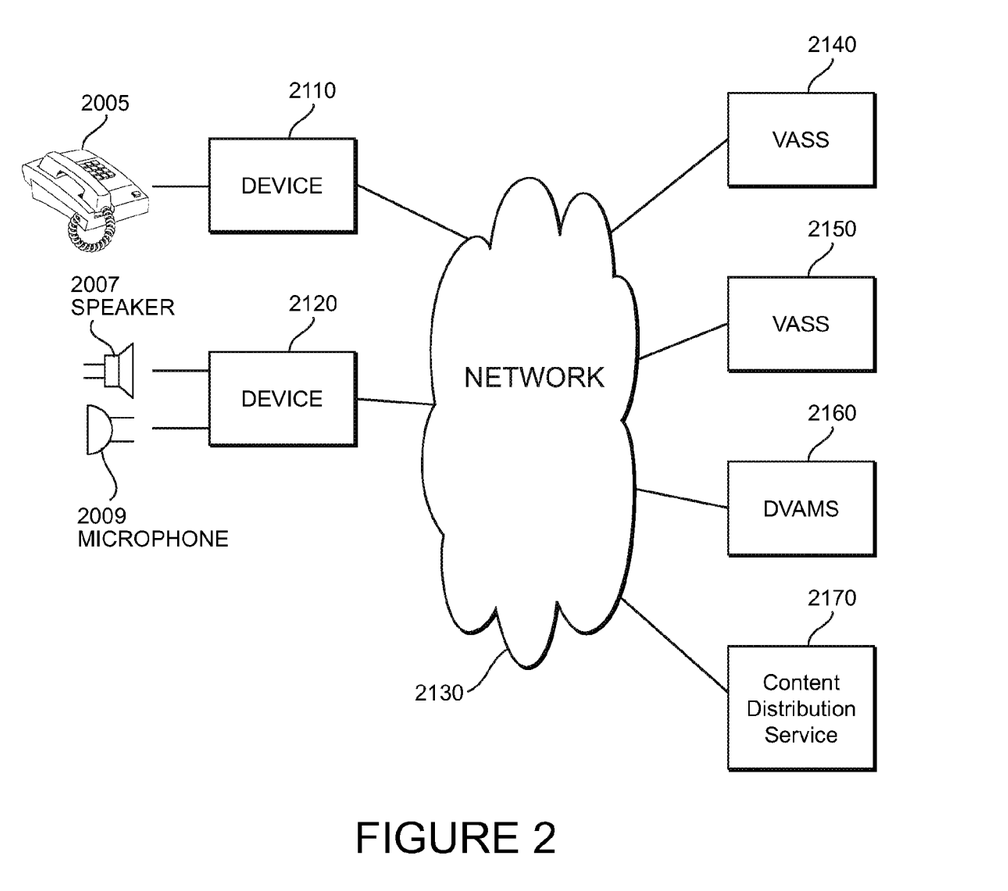
FIG. 2 is a diagram illustrating elements of another system embodying the invention.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 2. In doing so, we will introduce some new definitions and terminology which will be used throughout the remainder of the detailed description.

A DVAESA would be configured to deploy and utilize one or more Voice Application Agents (hereinafter "VAAs") which themselves enable the delivery or performance of a VA through a local device that would typically be located in a user's home or office. In some instances, a VAA may be wholly resident on a single local device. In other instances, the functions of a VAA may be split between multiple portions of the overall system. Likewise, a single local device may only host one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 2 could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

The devices 2110 and 2120 appearing in FIG. 2 would be the local embedded devices that are typically located at a user's home or office. As shown in FIG. 2, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network.

A system embodying the invention also includes components that deliver voice applications, data and other forms of content to the local devices. These components could include one or more Voice Application Services Systems (hereinafter VASSs). In the system depicted in FIG. 2, there are two VASSs 2140 and 2150. A system embodying the invention could have only a single VASS, or could have multiple VASSs.

One of the primary functions of a VASS is to render VAs and to then provide VA components to VAAs. In preferred embodiments, a VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety factors. The distribution of the personalized VA components to the VAAs could also be accomplished in multiple different ways.

A system embodying the invention may also include one or more Content Distribution Services (hereinafter a "CDSs"). This is an optional component that basically serves as a data storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

With all of the above as background regarding the system architecture, we will now turn to a description of specific systems and methods embodying the invention that are used to monitor a user as the user dials a telephone number, and that are used to take some action, based on the dialed number, in addition to or other than connecting the user to the dialed telephone number.

Figure 3:
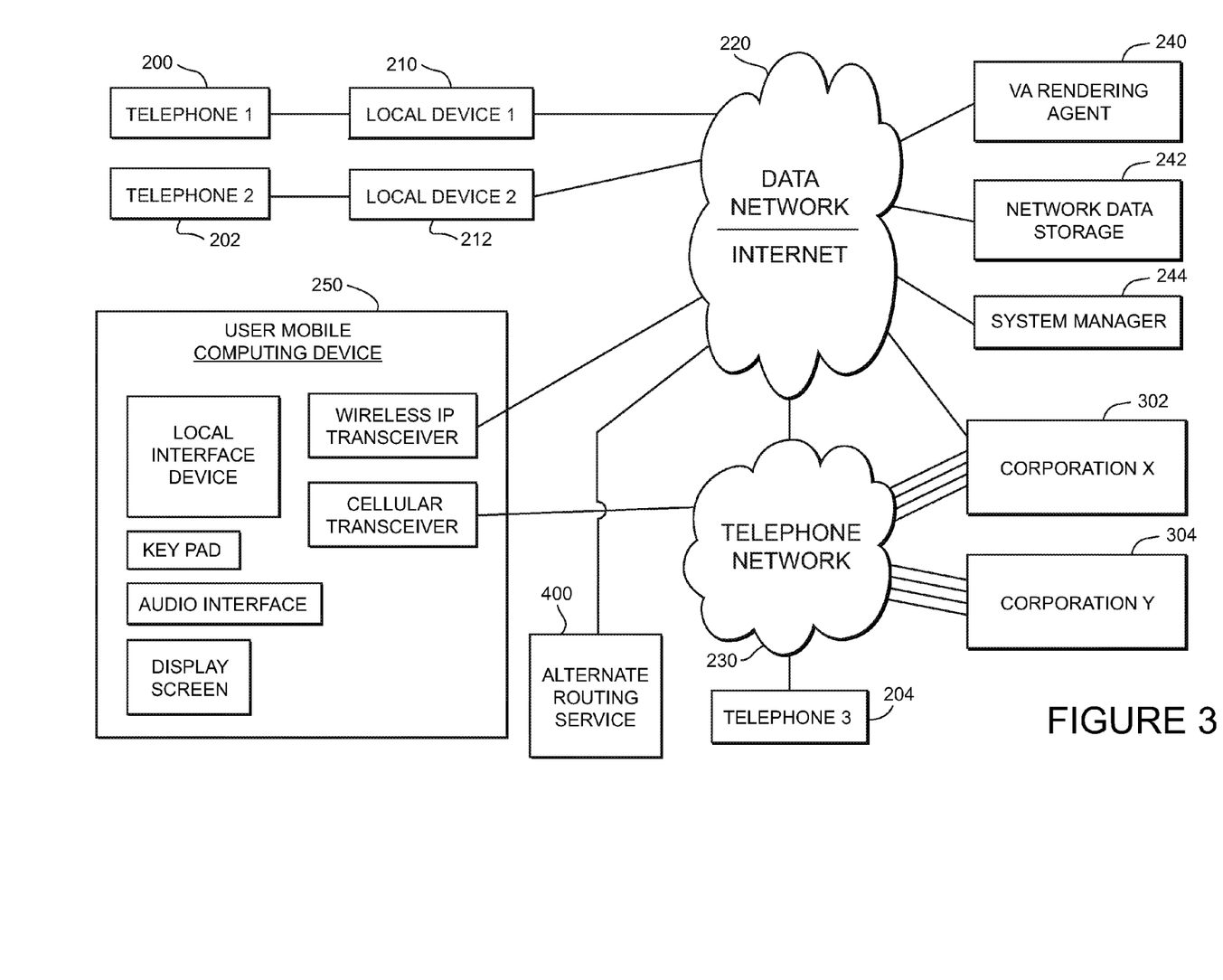
FIG. 3 is a diagram illustrating elements of another system embodying the invention.

FIG. 3 shows details of a system embodying the invention, and how the system may be connected to various third party systems. As shown in FIG. 3, a first user could connect to the system using telephone one 200, which is connected to local device one 210, which is itself connected to the data network 220. A second user could connect to the system using telephone two 202, which is connected to local device two 212, which is itself connected to the data network. Note, in the embodiment illustrated in FIG. 3, the users have telephones 200, 202 to connect to the system. In alternate embodiments, any type of audio interface could be used to access the system. Likewise, an audio interface other than a telephone could be used to establish a telephone call through one of the local devices.

As explained above, in some embodiments the local devices 210, 212 would include a voice browser and speech recognition elements so that the users can utilize their telephones as an audio interface to access and use the system. In other words, the users would utilize their telephones to access voice applications that are performed by a VAA on one of the local devices. In other instances, the users might wish to simply use their telephones as telephones to place a telephone call. Or, as mentioned above, a user might utilize an audio interface other than a telephone to place a telephone call.

When a first user wants to make a telephone call, he could accomplish this in several different ways. The first user might simply use the keypad on telephone one 200 to dial the telephone number of a party the user wishes to reach. The first user could also pick up his telephone 200 and issue spoken commands to the system instructing the system to place a telephone call to a particular number or to a particular party or business. As explained above, the system would be capable of interpreting the user's spoken input. So the user might be able to simply pick up his telephone and speak a command such as "Call John Smith."

If the user identifies someone in the user's pre-stored address book, the system could perform a lookup using the user's address book to determine the telephone number of the party the user wishes to reach. If the user identifies a company name, and that company name is not in the user's address book, the system might check a directory assistance listing or some other third-party created directory to find a telephone number for the requested company.

Once the system has the telephone number of the party that the first user wishes to reach, the system could proceed in multiple different ways. If the first user is trying to reach the number corresponding to telephone three 204, the system would establish a telephone call through the data network 220 and through the telephone network 230 to establish a telephone call between telephone one 200 and telephone three 204.

Alternatively, if the first user is trying to reach the number connected with telephone two 202, the system could establish a telephone call between telephone one 200 and telephone two 202 using the local devices connected to those phones, and the data network 220. In this instance, assets of a regular PSTN would not be needed to establish the call. Because assets of the PSTN are not used, the cost of completing the call could be lower than in the situation where telephone one 200 is connected to a called party through the telephone network 230.

If the first user was trying to reach Corporation Y 304, the system might learn this because the user speaks a command specifically asking to be connected to Corporation Y. In other instances, the user might enter the telephone number for Corporation Y using the keypad on his telephone. In still other instances, the user might verbally request that a call be placed to Corporation Y where the verbal request includes speaking the telephone number for Corporation Y 304. Regardless of how the system receives an instruction to establish a telephone call to Corporation Y, the system would then attempt to connect the first user's telephone 200 to Corporation Y 304 through the telephone network 230.

As illustrated in FIG. 3, Corporation Y 304 has multiple telephone lines that are connected to the telephone network 230. If the system attempts to connect the first user's telephone 200 to Corporation Y through the telephone network, and the main telephone number for Corporation Y 304 is already in use, the telephone network 230 would know to connect the call to Corporation Y through an alternate rollover line. Unfortunately, Corporation Y will only have a fixed number of telephone lines connected to the telephone network 230. Thus, there will be a limit to the number of calls that can be placed to Corporation Y at any given moment through the regular telephone network 230.

If the first user was attempting to reach Corporation X 303, the system would have two options for connecting the call. The system could connect the call through the telephone network 230, or the call could be connected through the data network 220.

Typically, completing a call using the telephone network will be more expensive than completing the call through the data network 220. Thus, it would be generally preferable to connect the call through the data network 220, thereby bypassing the telephone network 230. This would be particularly true if the first user was attempting to call a 1-800 number established by Corporation X, where Corporation X must pay all charges for connecting the call through the telephone network 230. For these reasons, we would expect Corporation X to prefer that, whenever possible, calls be connected via the data network 220, rather than through the telephone network 230.

Of course, corporation X 302 and corporation Y 304 would both have to maintain regular toll free customer service telephone numbers, and associated telephone lines. Many customers would only be able to reach the corporation through the telephone network, so keeping those connections is essential. However, if a party is trying to reach a corporation's customer service line, and that customer could be connected through the data network 220 instead of the telephone network 230, connecting the customer through the data network would save the corporation the charges that would otherwise be paid to the telephone company.

There may be additional reasons for connecting a customer to a corporation or business via a data network, as opposed to via the regular telephone network. For instance, the data network connection might have a much greater upper limit in terms of the number of calls that can be handled simultaneously, as compared to regular telephone line connections. Or said differently, it might be less expensive for the corporation to maintain the capability to handle a large number of simultaneous calls through the data network 220, as opposed to handling the same number of simultaneous calls through the telephone network 230. Moreover, if the corporation can handle a portion of its call volume via a data network connection 220, the corporation might be able to reduce the number of separate telephone lines that must be maintained to handle peak call volume. All of these differences could result in cost savings to the corporation.

In addition, when a customer is connected to the corporation via a data connection, it might be possible for the customer and the corporation to interact in ways that would be impossible over a normal telephone connection. For instance, it might be possible to set up a video conference between the customer and the corporation, or possibly a shared computer screen connection. Other types of interactions via the data connection might also be possible in the future.

For all the above reasons, there are good incentives for a corporation to prefer that customers be connected to them via a data connection, as opposed to a regular telephone line connection. Because of the cost savings which can be realized, it might be possible for system operator to generate revenue by connecting calls to corporations and businesses through the data network 220, instead of through the telephone network 230.

With a system as described above, the system can monitor the telephone number and/or the identity of the person or business that a user is attempting to reach via a telephone call. And in some instances, the system might be able to route the call through the data network to save the called party some expenses.

If a user is asking the system to dial the 1-800 telephone number of a corporation, and the system knows that the call could be connected to the corporation via a direct data link through the data network 220, as opposed to the telephone network 230, the system might deliberately set up the call using the data network 220. The user will not know the difference, because the call would still be established to the same called party. But the corporation will realize a cost savings. And for this reason, the corporation might be willing to pay the system for connecting the call in this fashion, rather than by connecting the call through the telephone network 230.

The system could take this action in multiple different situations. For instance, if a user simply picks up his telephone and dials a number, the system would need to monitor the number being dialed. Likewise, if the user picks up his telephone and speaks a number, the system would need to note the number. If the user speaks the name of a person or business, the system would need to determine the telephone number for that person or business. The system would then check to see if a connection to the party having that telephone number could be established through a data network connection instead of a regular telephone network connection. If so, the system could use the data network to establish the call. As explained above, this action by the system might be a revenue generating action which results in the receipt of a payment from the called party.

Another situation where cost savings might come into play is where the user is trying to reach another party's mobile telephone or mobile computing device. Many mobile telephones and/or mobile computing devices are capable of establishing a voice call using either the cellular telephone network, or a wireless data network. In the embodiment illustrated in FIG. 3, a mobile computing device 250 with telephone capabilities can connect to the telephone network 230 (in this case a cellular telephone network) and/or to a wireless router connected to the data network 220. When the mobile computing device is within range of a wireless router, it may automatically establish a data link to the router. Once that link is established, the portable computing device would be capable of establishing a voice session or a telephone call through the wireless router.

As explained above, a mobile computing device may include the software and hardware elements that enable the device to act as a local device similar to the local device 210 connected to telephone one 200, or the local device 212 connected to telephone two 202. The speaker and microphone present in the device then act as the audio interface.

When a mobile computing device is configured in this manner, and the mobile computing device has established a data link to a nearby wireless router, a first user using telephone one 200 could be connected to a second user of the mobile computing device entirely through the data network 220. There would be no need to use the cellular telephone network to reach the second user. And, of course, it would be far less expensive for the second user if the call is established through the data network 220 instead of through the cellular telephone network.

In this type of a situation, if the first user dials the cellular telephone number for the second user's mobile computing device, the system could check the number to determine if the same device is presently reachable through the data network. If so, the call would be established in that fashion. If the second user's mobile computing device is not presently connected to the data network, then the call could be routed through the cellular telephone network. Here again, the second user might be willing to pay the system some amount of money for connecting the call through the data network, as opposed to the cellular telephone network, whenever possible.

In order for the cost savings discussed above to be realized, it is necessary for the system that receives dialing instructions from a user to know that it is possible to connect a desired telephone call through a data network connection, as opposed to a telephone network connection. However, because of the cost savings that can be realized, the people and businesses who are capable of receiving a telephone call through the data network 220 would have an incentive to register with the system and inform the system of the fact that they can be reached through the data network 220. Thus, once a system as described above is established, one would expect people and businesses that can realize a cost savings to immediately register with the system.

In addition to knowing that it is possible to connect a telephone call through a data connection, it is also necessary for the system to check, each time that a user requests that a telephone call be established, to determine if the call can be placed through a data connection. Thus, part of the method of placing a call for a user would include performing a check to determine if the call can be established through a data connection.

As mentioned above, if a system as described above reroutes a telephone call through a data network, instead of through the regular telephone network, it might be possible for the system to receive a payment from the called party. So long as the payment made to the system operator to connect the call via the data network 220 is less than what the called party would have to pay to a telephone service provider to receive the call through the telephone network 230, it would make sense for the called party to receive the call via the data network. And if the system is configured to receive a payment from the called parties in this fashion, the system would also have to include means for charging or billing the called parties.

As noted above, one would expect potential called parties to want to register with the system to inform the system that they can receive calls over the data network 220. Part of this registration process could include agreeing to pay to receive calls in this fashion. And the payments could be structured in many different ways.

In the system illustrated in FIG. 3, an alternate routing service 400 is connected to the data network. The alternate routing service 400 would be part of the system embodying the invention which provides voice applications to users.

Whenever a user accesses the system and attempts to place a telephone call, a voice application performed on the local device handling the action for that user would consult with the alternate routing service 400 through the data network 220. The voice application would query the alternate routing service 400 to determine if the telephone number which the user is attempting to reach is a party who has registered with the service as being able to receive telephone calls via the data network 220.

Figure 4:
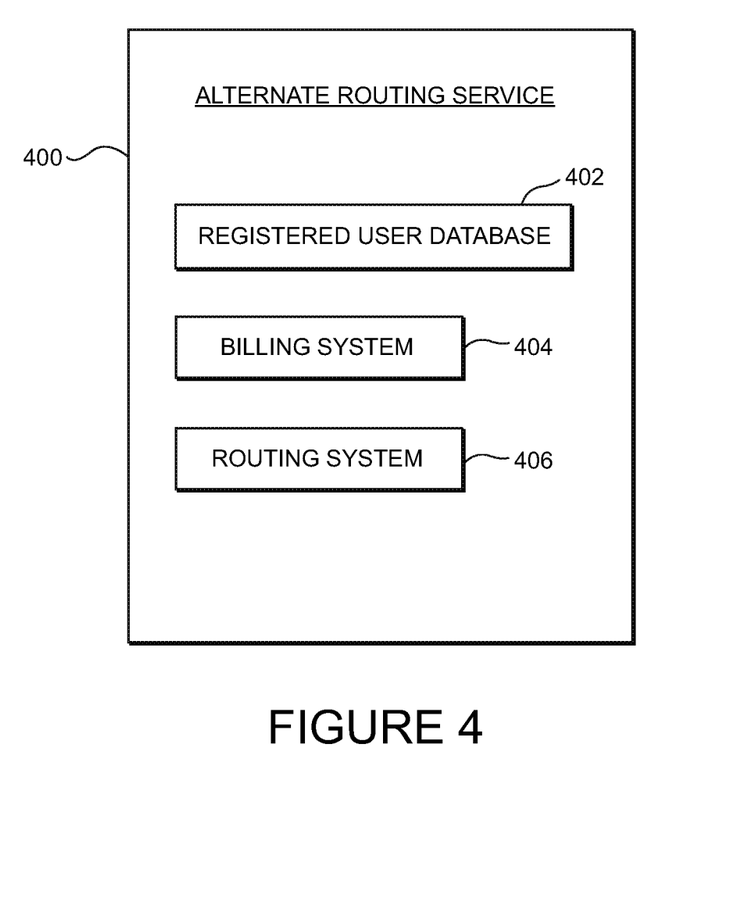
FIG. 4 is a diagram illustrating elements of an alternate routing service embodying the invention.

Features of a typical alternate routing service 400 as shown in FIG. 4. The alternate routing service 400 includes a Registered User's Database 402 which lists the telephone numbers of people who have registered with the alternate routing service. The Registered Users Database 402 might also include the IP address(es) through which an IP-based telephone call can be routed in order to connect with the registered party.

The alternate routing service 400 also includes a billing system 404. The billing system would be used to bill the called parties for telephone calls that are sent to the called parties via the data network 220. The billing could take place in any number of different ways. For instance, called parties could pay on a call-by-call basis to receive telephone calls through the data network. The called parties could be charged by the minute for calls that they receive. In other situations, a business or person might register for a fixed fee that they will pay for a given period of time in order to receive calls through the data network. Any type of billing system which results in the system operator receiving a payment for routing calls through the data network, instead of the through the telephone network, could be used.

The alternate routing service 400 might also include a routing system 406. As noted above, when a called party is to receive a telephone call through the data network 220, it is necessary for the voice application attempting to establish the call to know the IP address of the device or router connected to the data network through which the called party can be reached. In some instances, a single person or a single business might have multiple IP address at which they can be reached. Also, a party registered with the system might have an IP address that changes over time. Thus, each time that a particular party obtains a new IP address, the called party would need to forward that information to the routing system 406 so that it is always readily available.

In those instances where a party has multiple internet IP addresses at which it can be reached, it may be less extensive to route a call through one of the IP address as opposed to the other IP addresses. In order to minimize the cost of completing the call to the called party, the routing system 406 would track which IP addresses carry the lowest charges, and the routing system 406 would provide those IP addresses when a request to reach the called party is received.

In a similar fashion, the routing system 406 may know that some IP addresses for a called party typically provide a greater quality of service than other IP addresses. Accordingly, whenever possible, the routing system would want to provide the better quality IP addresses to a local device attempting to establish a telephone call to the called party.

For all the reasons discussed above, an alternate routing service including a routing service 406 can help to minimize the overall costs which are incurred, and it can also help to increase the quality of the telephone connections which are made through the data network.

During a typical call procedure, a first user would utilize his telephone 200 and the first user would ask to be connected to a desired called party. As noted above, this could involve the user dialing the telephone number on a telephone keypad, speaking a request to be connected to a particular spoken telephone number, or simply speaking a request to be connected to named party or business. A voice application performed on the local device 210 would then query the alternate routing service 400 to determine if the desired called party is one of the registered users who can receive telephone calls through the data network 220. If that is the case, the alternate routing service 400 would provide the voice application with the IP address of the router or device connected to the data network, through which the called party can receive a telephone call. The local device 210 would then actually establish a telephone call to the called party using that IP address. On the other hand, if the alternate routing service 400 indicates that nobody corresponding to the called party telephone number has registered with the service, the voice application would proceed to set up the telephone call through the normal telephone network.

Figure 5:
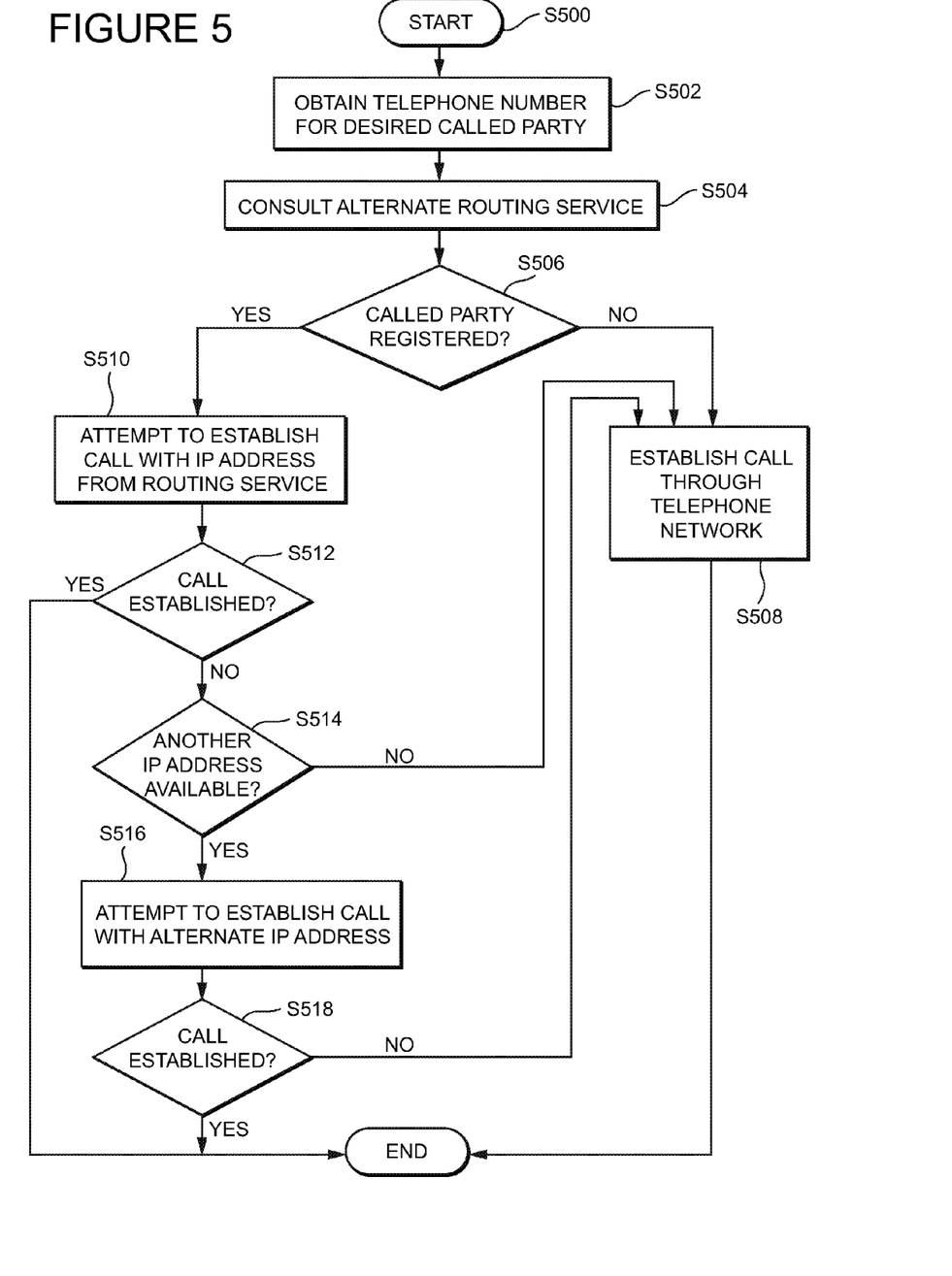
FIG. 5 is a diagram illustrating a method embodying the invention.

FIG. 5 illustrates the steps of a method embodying the invention. At step S502 a user would attempt to place a telephone call to a called party. As the user attempts to place the telephone call, the system obtains the telephone number for the desired called party. The voice application interacting with the user then contacts the alternate routing service in step S504 to determine if the called party has registered with the system.

The alternate routing service will consult its database of registered users and determine whether or not the called party is a registered user. In step S506, if the called party is not a registered user, the method proceeds to step S508 and a telephone call to the called party is established through the normal telephone network.

On the other hand, if the alternate routing service determines if that the called party is a registered party, the method would proceed to step S510. The alternate routing service would provide the IP address for the called party, and in step S510, the voice application interacting with the user would then attempt to establish the telephone call through the data network. In step S512 if the call has been established, the method would end. However, if the original IP address provided by the alternate routing service could not be used to establish a telephone call with the called party, in step S514 the system would determine whether or not there is an additional IP address which could also be used to reach the called party. If there are no other IP addresses available for the called party, the method would then proceed to step S508 and the local device would establish the telephone call to the called party through the normal telephone network. Alternatively, if there is another IP address available to reach the called party, in step S516 the voice application would attempt to establish the telephone call through the data network using the alternate IP address. In step S518, if the call still cannot be established using the alternate IP address, the method would proceed to step S508 and the voice application would establish the telephone call through the telephone network. On the other hand, if it was possible to establish the telephone call using the alternate IP address, the method would simply end.

The re-routing of telephone calls is just one example of an action that could be taken by the system when a user attempts to place a telephone call. Many other types of actions are also possible.

For instance, when a user attempts to place a telephone call to a called party by dialing the digits on a telephone keypad, the system might check the user's address book. If there is an entry for that number, the system could play to the user a message such as "You could also place this telephone call by speaking the command to call John Smith." Providing messages such as this to new users of the system could be helpful in instructing new users about the capabilities of the system, and how to make use of those capabilities.

In another example, the system might utilize a dialed telephone number to trigger the playing of an advertising message. For instance, if the system has an advertising deal with a particular business, the business might pay the system to play an advertisement at key points in time.

As one example, pizza delivery business A could set up an advertising deal with the system that will cause the system to play an advertising message to a caller each time a caller dials the telephone number of any other pizza delivery service. This deal could be bounded in its geographical reach, so that only callers within the delivery area of pizza delivery business A will be played messages.

Once the deal is in place, the system would monitor all calls placed by users within the delivery area of pizza delivery business A. And each time that a caller located within this area attempts to place a telephone call to a pizza delivery business other than pizza delivery business A, the system would play an advertising message such as "Pizza delivery business A is running a two for one special. Would you like to be connected to pizza delivery business A instead?" If the caller answers "yes," then the call would be routed to pizza delivery business A instead of to the pizza delivery service originally dialed by the user.

For the system to operate in this fashion, a voice application being performed on the local device must monitor the telephone number dialed or requested by the user, and that number would have to be resolved to a particular business. If the voice application is able to determine that the call is being placed to another pizza delivery service, then the voice application would know to play the advertising message to the caller.

Obviously, this type of advertising is highly targeted to exactly the audience that is prepared to make an immediate purchase. And because the message can be geographically targeted, the advertising should be even more effective. Thus, the system might be able to charge a premium price for delivering advertising messages in this fashion.

The distributed nature of the system makes this type of advertising possible. Once an advertiser has put an advertising deal in place with the system, the system can update the voice applications on all of the local devices in the geographical area that is to be covered under the advertising deal. This means that not all voice applications on local devices in the system would need to know about the new advertising deal. Only the voice applications on those local devices located within the geographical area covered under the advertising deal would need to operate in this fashion. Likewise, in any given geographical area, there are only likely to be a few competing businesses. Thus, the voice applications would only need to compare the user requested number to a small number of other business numbers to determine if it is necessary to play the advertising message.

In a more general sense, the system could be configured to take any one of multiple different actions each time that a user attempts to place a call.

For instance, when a user attempts to reach another party, the system could launch a voice application that plays a short message to the user while the call is being established between the user's local device and the called party. So long as such messages do not take longer than a typical call setup procedure, the message will be completed before the call is connected. The message could be a reminder about something, or it could be advertising content.

The message that is played to a user in this scenario could be dependent on the party that the user is trying to reach. In that case, the voice application that is responding to the user's request to connect the call might determine the identity of the called party, and then trigger the performance of a particular voice application that plays an audio message to the user relating, in some fashion, to the identity of the called party. This could be particularly true if the message played to the user is advertising content.

In other instances, the audio message that is played to a user might be a little longer than the time required to setup the call. If this is the case, the voice application that is setting up the call might trigger the performance of another voice application that will play the longer message. The voice application setting up the call will monitor the call setup, and if the called party answers the call before the audio message is finished playing, the voice application might play a message to the called party indicating that he is being connected to a caller and should wait a moment for the call to be completed. This would give the second voice application time to complete the playing of the audio message. In some instances, yet another voice application might be performed to deliver this message to the called party. And when the audio message is completed, the user would be connected to the called party.

In still other instances, if the audio message to be played to the user is longer than the normal call setup time, a first voice application that is setting up the call might trigger the performance of another voice application that will play a message to the user, and the first voice application might then wait before beginning the call setup. The first voice application might wait until the entire message has been played before attempting to setup the call. Or, the second voice application that is playing the audio message might send a signal to the first voice application when the message is a few seconds from being completed. When it receives this signal, the first voice application could begin the call setup procedure. Thus, when the message finishes playing to the user, the call setup will also be nearly complete.

In still other examples, when a user requests to be connected to a party, the voice application handling the call setup might trigger the performance of a second voice application that will play some type of audio content to the user while the call setup procedures are taking place. And as soon as the call setup procedures are complete, the audio content played to the user would be halted. This scenario might be applicable where the audio content is simply background music or a background tone that provides an indication to the user that the call setup procedures are taking place.

In another example, the voice application handling a call setup might use the telephone number provided by the user to determine the identity of the called party. This could be done with the user's address book, or with a central or third party directory or reverse lookup service. If the voice application is able to determine the identity of the called party, the system could announce to the user, "Calling John Smith." In this instance, if the user realizes that the wrong party is being called, the user could halt the call setup procedures and try again. Under this scenario, the lookup and announcement of the called party might be done by the same voice application doing the call setup, or by another separate voice application that is called by the voice application handling the call setup.

If the voice application uses a directory other than the user's address book to identify the called party, the voice application could ask the user if the user would like to add this party to his address book. In still other instances, the voice application might track the number of times the user attempts to reach a party that is not in the user's address book. And if the user attempts to call that person more than a predetermined number of times, the voice application could then ask the user if he would like to add the called party to his address book. In still other embodiments, the voice application might decided to automatically add the called party to the user's address book, and the voice application might just inform the user that it has been done.

The examples given about are only intended to be illustrative. A system embodying the invention could take any type of action after monitoring the telephone number that a user has requested to reach. Thus, the invention is not limited to the examples given above.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of responding to a request to place a telephone call, comprising:
    identifying, when a user requests that a telephone call be placed to a business through a telephony system, a telephone number of the business, wherein the telephone number of the business is identified by a voice applications agent that is resident, at least in part, on a local device or a voice application that is performed by a voice applications agent that is resident, at least in part, on the local device;
    determining, based on the identified telephone number, if a voice application that is relevant to the goods or services provided by business exists, or if a voice application that has been specifically created for the business exists;
    causing the requested telephone call to be connected to the business through a telephony system if no voice application relevant to the business exists; and
    performing a voice application relevant to the goods or services provided by the business or a voice application that has been specifically created for the business, if one exists, wherein the voice application is performed by a voice applications agent that is resident, at least in part, on the local device.

2. The method of claim 1, wherein the step of identifying the telephone number of the business comprises:
    receiving a spoken command from the user via an audio interface that is part of the local device or that is coupled to the local device; and
    interpreting the spoken command using speech recognition assets to identify the telephone number of the business.

3. The method of claim 2, wherein the step of interpreting the spoken command comprises:
    using speech recognition assets to determine a name of the business spoken by the user; and
    searching a contact list using the determined name to identify a telephone number corresponding to the name.

4. The method of claim 1, wherein the determining step comprises searching a database of voice applications using the identified telephone number.

5. The method of claim 1, wherein the performing step comprises performing a voice application that causes the requested telephone call to be connected through a data network instead of a telephony system.

6. The method of claim 5, further comprising billing the called party for connecting the requested telephone call via the data network.

7. The method of claim 1, wherein the performing step comprises performing a voice application that causes a telephone call to be connected to a telephone number other than the telephone number of the business specified by the user.

8. The method of claim 1, wherein the performing step comprises performing a voice application that collects information from the user regarding a function or purpose that the user wishes to accomplish by placing the requested telephone call.

9. The method of claim 8, wherein the performing step further comprises performing a voice application that attempts to assist the user in accomplishing a function or purpose that the user wishes to accomplish by placing the requested telephone call.

10. The method of claim 1, wherein the performing step comprises performing a voice application that displays or plays information to the user.

11. The method of claim 10, further comprising causing the requested telephone call to be connected via a telephony system or a data network while the performed voice application displays or plays information to the user.

12. The method of claim 10, further comprising causing the requested telephone call to be connected via a telephony system or a data network after the performed voice application has finished displaying or playing information to the user.

13. The method of claim 10, wherein performing the voice application further comprises receiving user input in response to the information that was displayed or played to the user, and taking further action based on the received user input.

14. The method of claim 1, wherein the determining step comprises determining if a voice application that has been specifically created for the business exists, and wherein the performing step comprises performing a voice application that has been specifically created for the business.

15. The method of claim 1, further comprising determining an identity of the business, and wherein the determining step comprises determining if a voice application exists which is relevant to the goods or services provided by the business.

16. A non-transitory computer readable medium having instructions stored thereon, which when executed by one or more processors of a local device and/or one or more processors of at least one computer server in communication with the local device, cause the local device and/or the at least one computer server to perform a method comprising:
  identifying, when a user requests that a telephone call be placed to a business through a telephony system, a telephone number of the business, wherein the telephone number of the business is identified by a voice applications agent that is resident, at least in part, on a local device or a voice application that is performed by a voice applications agent that is resident, at least in part, on the local device;
  determining, based on the identified telephone number, if a voice application that is relevant to the goods or services provided by the business exists, or if a voice application that has been specifically created for the business exists;
  causing the requested telephone call to be connected to the business through a telephony system if no voice application relevant to the business exists; and
  performing a voice application relevant to the goods and services provided by the business or a voice application that has been specifically created for the business if one exists, wherein the voice application is performed by a voice applications agent that is resident, at least in part, on the local device.

17. The non-transitory computer readable medium of claim 16, wherein the performing step comprises performing a voice application that causes the requested telephone call to be connected to the business through a data network instead of a telephony system.

18. The non-transitory computer readable medium of claim 16, wherein the performing step comprises performing a voice application that causes a telephone call to be connected to a telephone number other than the telephone number of the business specified by the user.

19. The non-transitory computer readable medium of claim 16, wherein the performing step comprises performing a voice application that collects information from the user regarding a function or purpose that the user wishes to accomplish by placing the requested telephone call.

20. The non-transitory computer readable medium of claim 19, wherein the performing step further comprising performing a voice application that attempts to assist the user in accomplishing a function or purpose that the user wishes to accomplish by placing the requested telephone call.

21. The non-transitory computer readable medium of claim 16, wherein the performing step comprises performing a voice application that displays or plays information to the user.

22. The non-transitory computer readable medium of claim 21, further comprising causing the requested telephone call to be connected via a telephony system or a data network while the performed voice application displays or plays information to the user.

23. The non-transitory computer readable medium of claim 21, further comprising causing the requested telephone call to be connected via a telephony system or a data network after the performed voice application has finished displaying or playing information to the user.

24. The non-transitory computer readable medium of claim 21, wherein performing the voice application further comprises receiving user input in response to the information that was displayed or played to the user, and taking further action based on the received user input.

25. The non-transitory computer readable medium of claim 16, wherein the determining step of the method that is performed comprises determining if a voice application that has been specifically created for the business exists, and wherein the performing step of the method that is performed comprises performing a voice application that has been specifically created for the business.

26. The non-transitory computer readable medium of claim 16, wherein the method that is performed further comprises determining an identity of the business, and wherein the determining step of the method that is performed comprises determining if a voice application exists which is relevant to the business.

* * * * *